(12) United States Patent
Norris et al.

(10) Patent No.: US 6,729,135 B1
(45) Date of Patent: May 4, 2004

(54) LIQUID FUEL RECIRCULATION SYSTEM AND METHOD

(75) Inventors: Eric Steven Norris, Simpsonville, SC (US); Steven William Backman, Greenville, SC (US); Robert Joseph Iasillo, Glenville, NY (US); Kevin Jon O'Dell, Rensselaer, NY (US); David J. Van Buren, Mechanicville, NY (US); Michael J. Alexander, Saratoga Springs, NY (US); Mark Andrew Cournoyer, Charlton, NY (US); Mark Andrew Johnson, Simpsonville, SC (US); Colin Wilkes, Delanson, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/317,177

(22) Filed: Dec. 12, 2002

(51) Int. Cl.[7] ................................................ F01K 13/02
(52) U.S. Cl. .......................................... 60/646; 60/657
(58) Field of Search ................................... 60/646, 657

(56) References Cited

U.S. PATENT DOCUMENTS 4,416,239 A * 11/1983 Takase et al. .......... 123/406.47
4,490,105 A * 12/1984 Hunsberger et al. .......... 431/65
5,819,796 A * 10/1998 Kunimitsu et al. ......... 137/587
6,141,967 A * 11/2000 Angel et al. .................. 60/737
6,145,294 A    11/2000 Traver et al.
6,145,318 A    11/2000 Kaplan et al.
6,405,524 B1    6/2002 Mistry et al.

OTHER PUBLICATIONS

Operational Reliability on Oil Fuel in Dual Fuel (Gas/Liquid) Gas Turbines; TIL 1107–3; Oct. 10, 1991; 2 pages.

* cited by examiner

*Primary Examiner*—Hoang Nguyen
(74) *Attorney, Agent, or Firm*—Nixon & Vanderhye PC

(57) ABSTRACT

A recirculation system for circulating distillate during gas fuel operation so as to reduce or eliminate distillate carbon formation. The recirculation system keeps the distillate's temperature below the carbon formation limit by circulating the distillate back to a heat sink and/or heat exchanger. The recirculating flow also exercises the flow dividers' gears without having to perform fuel transfers. Further, the system evacuates air from the liquid fuel lines to further decrease the likelihood of carbonaceous residue forming on any interior surfaces that are actually exposed to distillate.

24 Claims, 2 Drawing Sheets

LIQUID FUEL RECIRCULATION SYSTEM AND METHOD

BACKGROUND OF THE INVENTION

In dual-fuel gas turbines, the turbine operates by burning either a gaseous fuel or a liquid fuel, the latter fuel typically being distillate oil. These gas turbines have fuel supply systems for both liquid and gas fuels. The gas turbines generally do not burn both gas and liquid fuels at the same time. Rather, when the gas turbine burns liquid fuel, the gas fuel supply is turned off, and when the gas turbine burns gaseous fuel, the liquid fuel supply is turned off.

In an exemplary industrial gas turbine, the combustor may have an array of combustion cans, each of which has a liquid fuel nozzle and a gas fuel nozzle. In the combustion can arrangement, combustion is initiated within the combustion cans at a point slightly downstream of the nozzles. Air from the compressor flows around and through the combustion cans to provide oxygen for combustion. Water injection nozzles are arranged within the combustor to introduce water to the combustion process for the purpose of reducing NOx emissions by reducing the peak flame temperatures.

During distillate operation, liquid fuel systems rely on flow dividers (non-driven gear pumps) to evenly distribute flow to each combustion can. Because gas fuel is used as the primary fuel, liquid fuel systems may remain inoperable for relatively long periods. If the flow dividers are not exercised regularly, they become vulnerable to having their gears bind. Regular exercise for a flow divider is conventionally accomplished during the weekly fuel transfers TIL 1107-3.

Despite the fact that customers are encouraged to exercise their liquid fuel systems at least once a week, this recommendation is not always heeded. In some instances, customers have valid causes for not following this recommendation. Customers reasons for not periodically running the liquid fuel systems may include reliability issues, emissions concerns and an unwillingness to decrease loads simply to transfer fuels, especially when power is trading favorably.

Existing F-Class gas turbines that have dual fuel capacity (gas fuel as primary and distillate as backup) are susceptible to carbon deposits forming in the liquid fuel system. Research indicates that carbon formation begins when distillate is heated to a temperature of 350° F. in the absence of oxygen. In the presence of oxygen, the process accelerates and carbon formation begins at approximately 280° F. As carbon deposits accumulate, they effectively reduce the cross-sectional passages through which the liquid fuel flows. If the carbon deposition continues, particles may clog the distillate passages. Since the carbon particles may not be present upstream of the turbine compartment, minimum passage sizes are not an issue until the distillate has been subjected to the turbine compartment's heat.

When burning gas fuel the fuel nozzle liquid passages are purged but liquid fuel remains in the system up to the 3 way purge valve ready for an immediate fuel transfer. The gas fuel passages are purged when burning liquid fuel.

Differential pressures in the distillate and purge air lines serve to actuate three-way valves disposed between the flow dividers and the cans. When a turbine is operating on gas fuel, purge air, which runs at a higher pressure than the static liquid fuel system pressure during gas fuel operation, actuates the three-way valves such that distillate cannot enter any of the combustion cans. During liquid fuel operation, the fuel pump pressurizes the distillate so that its force is greater than that of the purge air. As a result, the piston within the three-way valve slides over to block the purge air flow and allow distillate into the combustion cans.

When a turbine is operating on gas fuel, as noted above, the liquid fuel system remains charged so that it is readily available for any fuel transfer requests. When liquid fuel systems remain inoperable beyond the recommended time limit, there is an increased likelihood that the static distillate within the turbine compartment will begin to experience carbon formation. Furthermore, due to the large difference in pressures, purge air often seeps across seals within the three-way valve's internal cavities. Air then comes into intimate contact with distillate on the other actuating side of the three-way valve. As noted above, distillate carbon formation initiates at a much lower temperature in the presence of oxygen. Considering that F-Class turbine compartment temperatures have been measured in excess of 315° F., carbon formation is even more likely to occur if the seeping purge air remains in contact with static distillate. As carbonaceous particles form, they pose the threat of clogging internal flow passages, which could result in a turbine trip while switching to liquid fuel operation.

Prior actions to prevent carbon formation include methods for dissipating heat from the turbine compartment, which have primarily focused on ventilating the surrounding air, and efforts to exercise the system to help prevent gear binding in flow dividers, as mentioned above.

FIG. 1 is a simplified schematic depicting the existing or conventional liquid fuel system. This particular schematic illustration is of the configuration associated with F-Class GE Gas Turbines. As illustrated, the liquid fuel system begins downstream of the fuel forwarding system. Thus, the liquid fuel flows into the current liquid fuel system configuration from the liquid fuel forwarding skid as illustrated at 10. During liquid fuel operation, fuel forwarding pumps provide distillate flow through the LP filters and to the inlet of the fuel pump 12. The fuel pump 12 creates positive distillate flow through the bypass control valve 16 and the stop valve 18. FIG. 1 corresponds to a turbine firing on natural gas with the distillate on stand-by. For that reason, the bypass control valve 16 and stop valve 18 are disposed to recirculate any distillate flow through respective bypass lines 20,22 to recirculation line 24. When the system is operating on liquid fuel, a portion is diverted to the flow divider 26 which evenly distributes flow to each combustion can 28, only one of which is illustrated in FIG. 1. Box 30 schematically illustrates the turbine compartment and the components that are contained within this compartment.

When a turbine is operating on gas fuel, as illustrated in FIG. 1, the liquid fuel system remains charged so that it is readily available for any fuel transfer request. But, system components sit idle while both control and stop valves 16,18 remain seated in their normally closed position. Purge air, which runs at a higher pressure than the static liquid fuel system pressure during gas fuel operation, actuates the three-way valve 32 associated with each combustor (only one of which is illustrated in FIG. 1) so that distillate cannot enter the respective combustion can 28. It is this same purge air, that actuates the three-way valve 32, that can seep past the seals in the three way valve, interact with distillate, and promote carbon formation.

BRIEF DESCRIPTION OF THE INVENTION

The invention provides a recirculation system for circulating distillate during gas fuel operation so as to reduce or eliminate distillate carbon formation. Adding a recirculation system embodying the invention offers multiple benefits.

First, it keeps the distillate's temperature below the carbon formation limit by circulating the distillate back to a heat sink and/or heat exchanger. Second, the recirculating flow exercises the flow dividers' gears without having to perform fuel transfers. Third, the system of the invention evacuates air from internal cavities around the three-way valves, which are the areas most likely to be exposed to air (oxygen) due to their operational nature.

The invention is thus intended to obsolesce the suggested practice that customers perform fuel transfers in order to exercise their liquid fuel systems. In addition to relaxing the recommendation for a periodic operation of the liquid fuel system, the recirculation system offers the benefit of increased reliability and availability.

The invention is thus embodied in a liquid fuel recirculation system for recirculating liquid fuel during gas fuel operation of a dual fuel gas-turbine, comprising: a valve for selectively directing liquid fuel to a liquid fuel nozzle of the turbine; a liquid fuel storage tank; at least one pump for pumping liquid fuel to said valve; a recirculation line for recirculating liquid fuel from said valve to one of said liquid fuel storage tank and said at least one pump; and a source of liquid fuel purge air operatively coupled to said valve; wherein said valve is constructed and arranged to shuttle between a liquid fuel mode wherein liquid fuel is directed to said liquid fuel nozzle, and a purge mode wherein liquid fuel is directed to said recirculation line and purge air from said purge air source is directed to said liquid fuel nozzle.

The invention may also be embodied in a system for recirculating liquid fuel during gas fuel operation of a dual fuel gas-turbine, comprising: a plurality of three-way valves, each for receiving liquid fuel from a liquid fuel flow divider and selectively directing the liquid fuel to a respective combustion can of the turbine; a liquid fuel storage tank; a primary liquid fuel pump for selectively pumping liquid fuel through said flow divider to said three-way valves; a recirculation pump for selectively pumping liquid fuel through said flow divider to said three-way valves; a plurality of recirculation lines, each for recirculating liquid fuel from a respective said three-way valve to a recirculating flow manifold; a common recirculating flow line for conducting liquid fuel from said manifold to at least of said pumps; and a source of liquid fuel purge air operatively coupled to each said three-way valve; wherein said three-way valves are constructed and arranged to shuttle between a liquid fuel mode wherein liquid fuel is directed to said combustion can, and a purge mode wherein liquid fuel is directed to said respective recirculation line and purge air from said purge air source is directed to said combustion can.

The invention also provides a method of reducing distillate carbon formation in a liquid fuel supply system during gas fuel operation of a dual fuel gas turbine comprising: providing a valve for selectively directing liquid fuel from at least one pump to a liquid fuel nozzle of the turbine; providing a recirculation line for recirculating liquid fuel from said valve to said at least one pump; communicating a source of liquid fuel purge air with said valve, wherein said valve is constructed and arranged to shuttle between a liquid fuel mode wherein liquid fuel is directed to said liquid fuel nozzle, and a purge mode wherein liquid fuel is directed to said recirculation line and purge air from said purge air source is directed to said liquid fuel nozzle; actuating said valve to said purge mode; operating a liquid fuel pump to direct liquid fuel to said valve; and recirculating said liquid fuel to said pump through said recirculation line.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

As noted above, hot temperatures in the turbine compartment lead to carbon formation in stagnant fuel lines. Carbon formation results in valve malfunctioning and/or nozzle plugging, which in turn causes excessive trips during fuel transfers, liquid fuel startups and liquid fuel operations. Fuel data indicates that if the tubing wall temperatures of the fuel oil system are held below 200 degrees F. than carbon formation will be minimized.

As will be described herein below, the liquid fuel recirculation system embodying the invention provides a number of functions. First, the system keeps the liquid fuel wetted wall temperature below 200 degree F. The system further maintains continuous operation of the system and prevents the settling of air and water that causes corrosion and subsequent binding of the gears in the flow divider. The fuel recirculation system also minimizes air entrapment/infiltration into the system.

Figure 1:
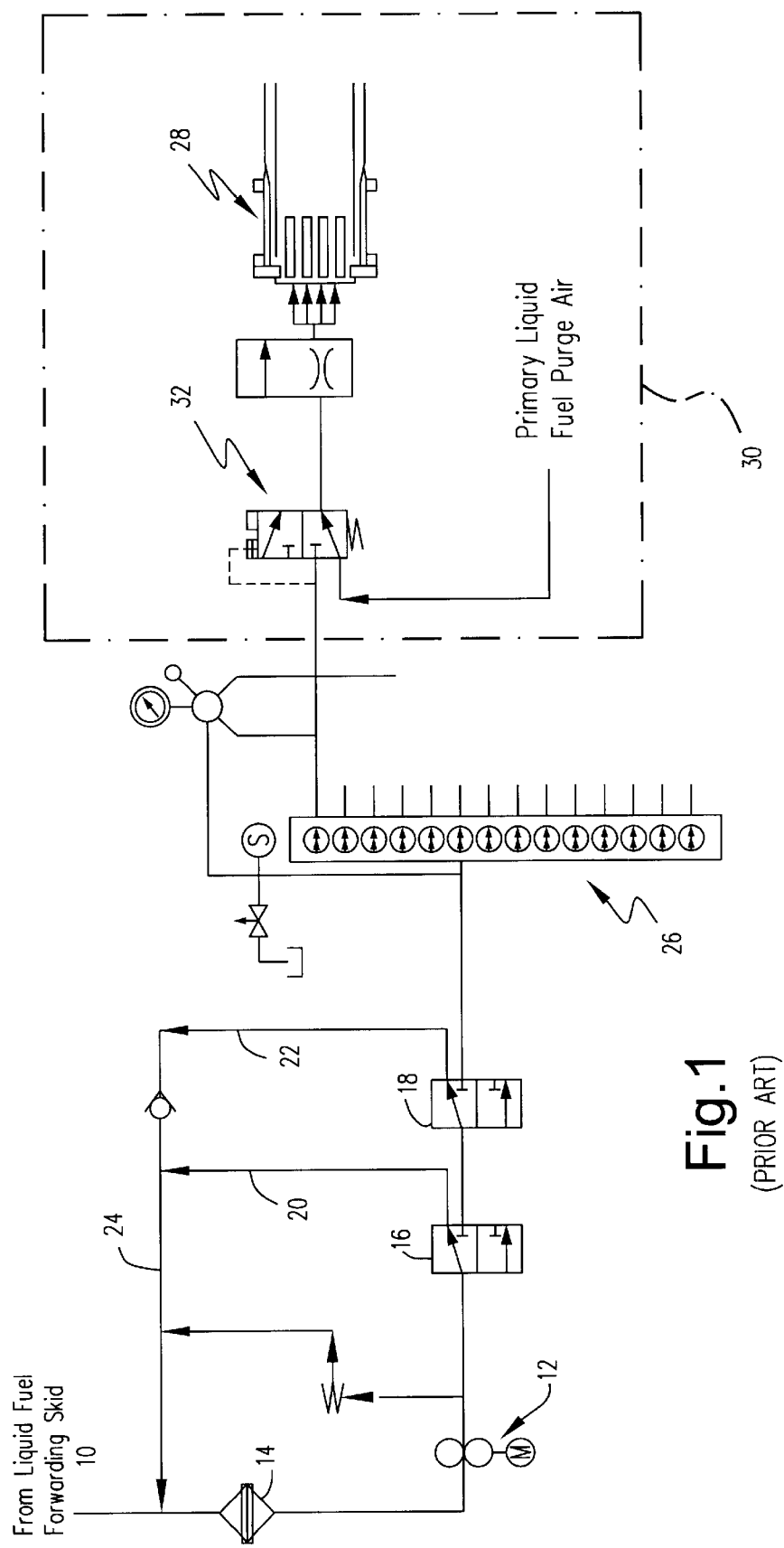
FIG. 1 is a schematic illustration of a conventional liquid fuel system.

As noted above, FIG. 1 is a schematic illustration of an exemplary conventional liquid fuel system. This particular schematic illustrates the configuration associated with F-Class General Electric gas turbines. This liquid fuel system begins downstream of the fuel forwarding system and continues through the current components to each of the turbines individual combustion cans. FIG. 1 configuration corresponds with the turbine firing all natural gas (distillate on standby).

Figure 2:
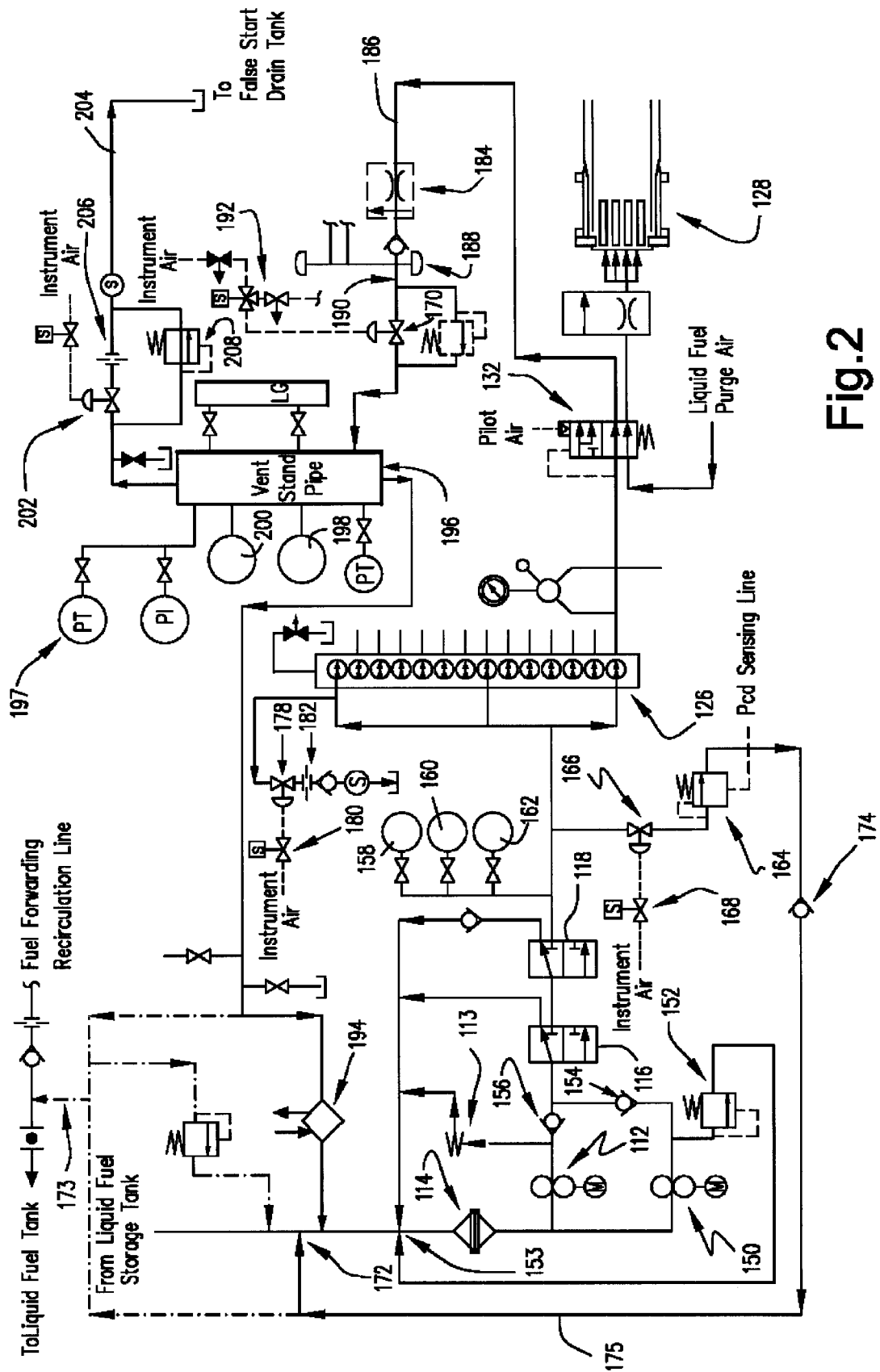
FIG. 2 is a schematic illustration of a liquid fuel system having recirculation lines as an embodiment of the invention.

The recirculation system embodying the invention does not modify the operation of the existing liquid fuel system, but rather is an overlay thereto. A liquid fuel system with recirculation embodying the invention is schematically illustrated in FIG. 2. In this embodiment, a recirculation pump 150 is provided to pump the liquid fuel. In an exemplary embodiment, the pump is a positive displacement gear pump. Typically, the main liquid fuel pump 112 is in operation during liquid fuel operation and pump 150, which is not required during liquid fuel operation, is shut down.

In the embodiment illustrated in FIG. 2, a pressure relief valve 152 is provided downstream of the recirculation pump 150 to prevent a possible over pressure situation for motor overload and for pump and piping protection. This pressure relief valve 152 relieves to the pump inlet as shown at 153. The main pump 112 has its own relief valve 113.

A check valve 154 is provided downstream of the recirculation pump 150 so that during liquid fuel operation, liquid fuel does not backflow through the recirculation pump. A check valve 156 is also provided downstream of the liquid fuel pump 112 so that during gas fuel operation, liquid fuel does not back flow through the main liquid fuel pump.

It should be noted that as illustrated in FIG. 1, during gas fuel operation using the conventional configuration, both the stop valve 18 and control valve 16 are in their normally closed position. According to the recirculation system schematically illustrated in FIG. 2, the control valve 116 and stop valve 118, which are illustrated in their closed position, are actuated open when the turbine is firing and has reached 95% of full speed. This coincides with starting the recirculation system in an exemplary implementation of the invention, as explained in greater detail below.

When liquid fuel pressure exceeds purge pressure, the three way valve spool 132 will start to shuttle and will eventually cut off purge flow. Accordingly, the liquid fuel pressure during liquid fuel recirculation should be kept sufficiently low so as not to affect the operation of the purge system while flame is present in the gas turbine. In a typical system, the liquid fuel pressure must be kept less than about 75 psid above purge pressure, or the three-way valve spool will start to shuttle. In an exemplary embodiment of the invention, the target control pressure for the system is approximately 20 psig below compressor discharge pressure (Pcd), so that if the three way valve leaks, the purge air will leak into the liquid fuel system rather than the liquid fuel leaking in to the nozzle. If air does leak into the liquid fuel system, the amount will be limited to do a differential pressure of only 20 psid. It should be noted in this regard that in an exemplary embodiment, the liquid fuel pressure is advantageously controlled as a function of Pcd instead of liquid fuel purge pressure because Pcd is closer to combustion chamber pressure (PCC).

Pressure transducers 158,160,162 are a part of the pressure release system associated with the three-way valves 132 and are shown in the illustrated embodiment for completeness. In this regard it should be noted that the three transducer relief system is not part of the recirc system per se, but are a part of an exemplary standard system and are provided because of the three way valves, not the recirc system. During gas fuel operation, the pressure of the liquid fuel is maintained at about 20 psid less than compressor discharge pressure (Pcd), as noted above, by pressure control valve 164, which is described in greater detail below. The transducers 158,160,162 are provided to monitor the pressure of the liquid fuel system. Multiple transducers are provided for redundancy so that the failure of one instrument does not cause an unnecessary trip of the gas turbine. In the illustrated embodiment, block valves are provided around the transducers so that the transducers can be isolated while the system is on line.

As mentioned above, pressure control valve 164 is provided to control the pressure upstream of the three-way valve 132 to a target pressure of about 20 psid below Pcd during gas fuel operation. By maintaining a small pressure differential, any leakage will result in purge air entering the liquid fuel system rather than leakage of liquid fuel into the fuel nozzle. If air does leak into the liquid fuel system, however, the amount will be limited due to a differential pressure of only 20 psid. The pressure control valve 164 controls the pressure mechanically, in the illustrated embodiment based on a spring and a sensing line from Pcd. A shut off valve 166 is provided upstream of pressure control valve 164 so that valve 164 can be isolated during liquid fuel operation, so that liquid fuel is not removed from the system. Shuttle valve 166 is actuated by instrument air and a solenoid valve 168 controls the instrument air to the valve 166. As noted, a small amount of recirculation flow is provided to valve 164 in order to adequately control the liquid fuel pressure. In a system adapted to closed loop flow, as shown with solid lines, the liquid fuel outlet from valve 164 relieves to the pump inlet as shown at 172. In a system adapted to open loop flow, as shown with dash-dot lines and as discussed in greater detail below, the liquid fuel from valve 164 ties back into the recirculation line (and back to the fuel oil tank) downstream of shutoff valve 170, as shown at 173. A check valve 174 is advantageously provided in this recirculation line 175 to prevent reverse flow.

Pressure relief valve 178 is part of the pressure relief system associated with the three-way valve 132 and is shown here for completeness. During rapid transients valve 164 will not act quickly enough to regulate the liquid fuel pressure. Valve 178 operates based on the signal from pressure transducers 158,160,162. In an exemplary embodiment valve 178 is adapted to open if the liquid fuel pressure is greater than or equal to, e.g., 5 psig over Pcd, when operating on gas fuel, and to close if the liquid fuel pressure is less than, e.g., 5 psid below Pcd, when operating on gas fuel. This is appropriate to ensure that nozzle tips are not damaged due to lack of purge on the one hand and to ensure the liquid fuel pressure does not get too low on the other hand, which may result in excessive leakage of purge air into the liquid fuel system, if the three-way valve 132 leaks. As with valve 166, valve 178 is actuated by instrument air and a solenoid valve 180 controls the instrument air to valve 178. In the illustrated embodiment, an orifice 182 is located downstream of pressure relief valve 178 so that when the valve is open an excess flow rate will not leave the system. In an embodiment of the invention, pressure relief valve 178 taps off a high point in the liquid fuel system. Thus, in the illustrated embodiment, valve 178 is placed at the inlet connection to the flow divider 126. In this way, the pressure relief valve can serve a dual purpose of removing air from the liquid fuel system. A timer (not shown) may be provided to periodically open valve 178 to remove air from the system.

Flow control valves 184 are provided to ensure that each three-way valve 132 recirculates the same amount of flow to ensure that the functionality of the flow divider 126 is not compromised. These valves are typically referred to as pressure compensated flow control valves 184. These valves will maintain a constant flow rate, regardless of changes in upstream and/or downstream pressure, that is designed to minimize any carbon formation within the valves. These flow control valves are preferably located in a cool environment with a maximum temperature of less than 200 degree F.

The individual recirculation lines 186 from each valve 184 (associated with a combustion can 128) tie together to a common manifold 188. This simplifies the tie-in process by combining, e.g., lines 186, into a common line 190. Shut off valve 170, mentioned above, is provided to shut off the recirculation flow during periods when recirculation is not required, such as when the turbine is down. In the illustrated embodiment, valve 170 is actuated by instrument air and a solenoid valve 192 controls the instrument air to that valve.

As mentioned above, liquid fuel recirculation systems embodying the invention may be provided as a closed loop system or as a so-called open loop system. For ease of explanation, both open loop and closed loop alternatives are illustrated in FIG. 2. The closed loop configuration is illustrated in solid lines whereas the adaptations for an exemplary open loop configuration are illustrated with dash dot lines. According to the closed loop embodiment, a heat exchanger 194 is provided to cool the recirculating flow, to minimize coking. An exemplary heat exchanger is a water cooled shell and tube type heat exchanger. The cooled recirculated liquid fuel output from the heat exchanger is flowed to the pump inlet adjacent the closed loop return flow 153 from valve 164.

According to the open loop configuration shown in dash dot lines, rather than providing an inline heat exchanger, the recirculation system takes advantage of the existing distillate storage tank as a heat sink. Heat gained while circulating through the compartment could thus be dissipated in the main storage tank due to its volume in relation to the recirculation system volume. In accordance with this alternative, existing distillate supply systems are out fed with the recirculation lines from the fuel forward system to the main storage tank. Tying into the lines running from the fuel forwarding skid to the tank as at 173 provides a means for the circulating distillate to complete the loop. In this embodiment, furthermore, a relief valve 210 is provided in case the valves in the fuel forwarding spool piece are inadvertently left closed, in which case, when recirculating on liquid fuel, the pressure of the recirculation system could get too high.

According to a further feature of the invention, the recirculation lines 186 slope up generally continuously to the recirculation manifold 188. In this way, any air that leaks past the three-way valves 132 will rise up to the vent standpipe 196 and can be removed from the system. The vent standpipe is the high point of the system to ensure that any air in the system will ultimately end up in the standpipe for removal.

In an exemplary embodiment, the standpipe has a low level switch 198 and a high level switch 200. Opening and closing of a vent valve 202 can then be based on the level switches, such that when the fuel in the vent standpipe reaches the high level switch, the vent valve 202 is closed and when the fuel level in the vent standpipe drops, due to the accumulation of air, to the low level sensor 198, the vent valve 202 is opened. In addition or in the alternative, a plurality of transducers 197 may be placed on the standpipe to provide a substantially continuous level measurement to aid in trouble shooting. Moreover, in the event of failure of level switches 198,200, then the transducers may be used as the main level system and can control the opening and closing of valve 202.

In the illustrated embodiment, the vent line 204 is directed to the false start drain tank. This is provided so that if liquid fuel is inadvertently vented, it drains to a vessel that is designed to accept liquid fuel. In the illustrated embodiment, an orifice 206 is placed in the vent line 204 to control the vent rate. A pressure relief valve 208 is placed around the vent valve 202 to account for expansion of the liquid fuel, if the liquid fuel temperature rises.

Valve 202 is typically adapted only to open when a threshold pressure is present in the standpipe as would be detected by the pressure transducer(s) 197. This ensures that only the standpipe vents and does not undesirably pull air from the false start drain tank. Normally, the vent standpipe is designed to be used only when running the recirculation system. However, functionality can be built in that will enable valve 202 to be used to vent accumulated air even though the recirculation system is not running.

Some pressure relief system requirements are shown in the illustrated embodiments for completeness. The system may be adapted to alarm if the liquid fuel pressure exceeds a certain valve above Pcd for a prescribed period of time to signify, e.g., that there is problem with the pressure relief system. Likewise, the system may be adapted to alarm if the liquid fuel pressure is less than a predetermined pressure below Pcd, also to signify that there is a problem with the pressure relief system.

The system may also trip the turbine if the liquid fuel pressure exceeds a particular value above Pcd for longer than a predetermined period when operating on gas fuel, in order to protect the fuel nozzles from possible damage due to lack of purge. Alarms(s) may also sound if one or more valves are open, or closed, for more than a predetermined period. For example, the system may alarm if valve 202 is open for greater than a particular period or open more than a predetermined number of times during a prescribed period, as this may indicate, for example, that there is three-way valve leak and/or that the standpipe is not venting properly.

Determination of the proper distillate flow rate through the recirculation system is advantageously based on upon selection of the maximum value among the limiting cases. Two system sizing cases were evaluated to establish the minimum recirculation rate: 1) flow required to dissipate heat gained from the turbine compartment and 2) flow specified in vendor data for proper operation of the required compensated valves (shown in FIG. 2 as 184). For the presently proposed embodiment, the pressure compensated valves were constrained to have their FIXED orifice passage size greater than the minimum passage size in the existing system. Among the two options, flow through the pressure compensated valves represented the higher value. Selecting the higher value, approximately 10 gpm, ensured the other scenario would be addressed as well.

The recirculation system embodying the invention is designed to function during liquid fuel operations as well as liquid fuel standby in order to minimize carbon formation in the recirculation lines. Recirculating fuel flows through the flow divider so that equal liquid fuel flow rates go to each combustor. Thus, the recirculation system does not inhibit the functionality of the flow divider.

When the recirculating system is in operation during liquid fuel operation, recirculated fuel passes through the liquid fuel pump 112 but by-passes the combustor. To ensure that this pump (and other equipment) have enough capacity, the amount of recirculated fuel during liquid fuel operation is minimized. The recirculation system may, in the alternative, be run intermittently when the liquid fuel system is running, providing the reciculation line fuel temperature is maintained below the carbon formation temperature.

In general when running on liquid fuel, no air should be in the liquid fuel system so that valve 202 can stay closed when operating on liquid fuel. However, the system can be adapted to override, for example, when air is likely to be introduced into the system. This will most probably occur when transferring to liquid fuel if the forwarding pumps have been shut down while operating on gas fuel.

The recirculation system provided as an embodiment of the invention is adapted to run any time when the turbine compartment is hot. The system could turn on at ignition, but in an exemplary embodiment turns on at 95% speed in order to simplify sequencing. Likewise, during a shutdown, the recirculation system turns off at 95% speed, again to simplify the sequencing. After a shutdown, the recirculation system does not need to run as the compartment temperatures are below the carbon formation temperature.

As mentioned above, the flow divider must be exercised to prevent gear binding. Recirculating liquid fuel with the system described herein effectively exercises the flow divider. The flow divider can also be exercised via fuel transfers rather than a continual flow. However, liquid to gas transfers must be performed at reduced loads, which reduces revenue and may result in temporary operation with out emissions compliance.

In addition to rejecting heat gained from the compartment, removing air from the liquid fuel lines further decreases the likelihood of carbonaceous residue forming on any interior surfaces that are exposed to distillate. In an exemplary embodiment of the invention, recirculation tubing lines that discharge from the three-way valves are arranged to flow up towards the turbine compartment's roof. Utilizing this configuration evacuates purge air that might seep back through the three-way valves and mix with distillate.

As mentioned above, air (oxygen) accelerates carbon formation. In addition, during liquid fuel operations, air pockets disrupt smooth delivery of liquid fuel. The recirculation system embodying the invention prevents air pockets from forming in the liquid fuel tubing to ensure smooth delivery of liquid fuel and decelerate carbon formation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A liquid fuel recirculation system for recirculating liquid fuel during gas fuel operation of a dual fuel gas-turbine, comprising:
    a valve for selectively directing liquid fuel to a liquid fuel nozzle of the turbine;
    a liquid fuel storage tank;
    at least one pump for pumping liquid fuel to said valve;
    a recirculation line for recirculating liquid fuel from said valve to at least one of said liquid fuel storage tank and said at least one pump; and
    a source of liquid fuel purge air operatively coupled to said valve;
    wherein said valve is constructed and arranged to shuttle between a liquid fuel mode wherein liquid fuel is directed to said liquid fuel nozzle, and a purge mode wherein liquid fuel is directed to said recirculation line and purge air from said purge air source is directed to said liquid fuel nozzle.

2. A liquid fuel recirculation system as in claim 1, wherein there are a plurality of said liquid fuel nozzles, and a plurality of said valves one valve being operatively coupled to each said liquid fuel nozzle, and further comprising a flow divider for dividing flow from said at least one pump to said valves, and further wherein there are a plurality of said recirculation lines, one recirculation line recirculating liquid fuel from each said valve, the plurality of recirculation lines terminating at a manifold for tying in the recirculation flows to a common flow line that flows to one of said liquid fuel storage tank and said at least one pump.

3. A liquid fuel recirculation system as in claim 2, wherein each said recirculation line is inclined upward to facilitate air flow towards said manifold.

4. A liquid fuel recirculation system as in claim 1, further comprising a verticle vent pipe in flow communication with said recirculation line for collecting air for venting from the recirculation system.

5. A liquid fuel recirculation system as in claim 2, further comprising at least one pressure relief valve upstream of said flow divider for controlling a maximum liquid fuel pressure flowed to said valve.

6. A liquid fuel recirculation system as in claim 2, further comprising at least one pressure relief valve tapping off an inlet to said flow divider provided at a high point in the system, whereby said pressure relief valve can be selectively opened to vent air from the system.

7. A liquid fuel recirculation system as in claim 2, wherein said valves are three-way valves; and further comprising a pressure compensated valve in each said recirculation line whereby each three-way valve recirculates the same amount of flow.

8. A liquid fuel recirculation system as in claim 1, wherein said valves are three-way valves; and further comprising a bypass passage providing flow communication between a liquid fuel flow line extending between said at least one pump and said three-way valves and said recirculation line, and a pressure control valve in said bypass passage for selectively diverting liquid fuel flow to bypass said three-way valves.

9. A liquid fuel recirculation system as in claim 1, further comprising a heat exchanger for cooling the liquid fuel recirculating through said recirculation line.

10. A liquid fuel recirculation system as in claim 1, wherein said valve is further constructed and arranged to flow liquid fuel to said recirculation line during said liquid fuel mode, whereby a portion of said liquid fuel can be recirculated through said recirculation line during liquid fuel operation.

11. A system for recirculating liquid fuel during gas fuel operation of a dual fuel gas-turbine, comprising:
    a plurality of three-way valves, each for receiving liquid fuel from a liquid fuel flow divider and selectively directing the liquid fuel to a respective combustion can of the turbine;
    a liquid fuel storage tank;
    a primary liquid fuel pump for selectively pumping liquid fuel through said flow divider to said three-way valves;
    a recirculation pump for selectively pumping liquid fuel through said flow divider to said three-way valves;
    a plurality of recirculation lines, each for recirculating liquid fuel from a respective said three-way valve to a recirculating flow manifold;
    a common recirculating flow line for conducting liquid fuel from said manifold to at least one of (1) said liquid fuel storage tank and (2) at least one of said pumps; and
    a source of liquid fuel purge air operatively coupled to each said three-way valve;
    wherein said three-way valves are constructed and arranged to shuttle between a liquid fuel mode wherein liquid fuel is directed to said combustion can, and a purge mode wherein liquid fuel is directed to said respective recirculation line and purge air from said purge air source is directed to said combustion can.

12. A liquid fuel recirculation system as in claim 11, wherein each said recirculation line is inclined upward to facilitate air flow towards said manifold.

13. A liquid fuel recirculation system as in claim 12, further comprising a verticle vent pipe in flow communication with said common recirculating flow line for collecting air for venting from the recirculation system.

14. A liquid fuel recirculation system as in claim 11, further comprising at least one pressure relief valve tapping off an inlet to said flow divider provided at a high point in the system, whereby said pressure relief valve can be selectively opened to vent air from the system.

15. A liquid fuel recirculation system as in claim 11, further comprising a pressure compensated valve in each said recirculation line whereby each three-way valve recirculates the same amount of flow.

16. A liquid fuel recirculation system as in claim 11, further comprising a bypass passage providing flow communication from a liquid fuel flow line extending between said pumps and said flow divider to at least one of (1) said common recirculating flow line and (2) an inlet line to said pumps, and a pressure control valve in said bypass passage for selectively diverting liquid fuel flow to bypass said flow divider.

17. A liquid fuel recirculation system as in claim 11, further comprising a heat exchanger for cooling the liquid fuel recirculating through said common recirculating flow line.

18. A liquid fuel recirculation system as in claim 11, wherein each said three-way valve is further constructed and arranged to flow liquid fuel to said recirculation line during said liquid fuel mode, whereby a portion of the liquid fuel can be recirculated through said recirculation line during liquid fuel operation.

19. A method of reducing distillate carbon formation in a liquid fuel supply system during gas fuel operation of a dual fuel gas turbine comprising:

providing a valve for selectively directing liquid fuel from at least one pump to a liquid fuel nozzle of the turbine;

providing a recirculation line for recirculating liquid fuel from said valve to said at least one pump;

communicating a source of liquid fuel purge air with said valve, wherein said valve is constructed and arranged to shuttle between a liquid fuel mode wherein liquid fuel is directed to said liquid fuel nozzle, and a purge mode wherein liquid fuel is directed to said recirculation line and purge air from said purge air source is directed to said liquid fuel nozzle;

actuating said valve to said purge mode;

operating a liquid fuel pump to direct liquid fuel to said valve; and recirculating said liquid fuel to at least one of (1) a liquid fuel storage tank and (2) said at least one pump through said recirculation line.

20. A method as in claim 19, wherein said step of actuating said valve includes reducing a pressure in the liquid fuel system so that a pressure differential between said purge air and said liquid fuel causes said valve to shuttle to said purge mode.

21. A method as in claim 19, wherein said step of providing a recirculation line comprises providing a recirculation line inclined upwardly from said valve for directing air from said valve and in said recirculation line to flow to and collect at a high point in the system.

22. A method as in claim 21, further comprising collecting air from said recirculation line in a standpipe and further comprising selectively venting said collected air.

23. A method as in claim 19, further comprising providing a bypass passage to provide flow communication from a liquid fuel flow line extending between said at least one pump and said valve to at least one of (1) said liquid fuel storage tank and (2) said at least one pump, a pressure control valve in said bypass passage selectively diverting liquid fuel flow to bypass said valve.

24. A method as in claim 19, further comprising cooling recirculating flow in said recirculation line by flowing the recirculating flow through a heat exchanger.

* * * * *